(12) United States Patent
Chen

(10) Patent No.: US 9,603,185 B2
(45) Date of Patent: Mar. 21, 2017

(54) METHOD OF MANAGING DISCONTINUOUS RECEPTION IN A WIRELESS COMMUNICATION SYSTEM AND RELATED WIRELESS COMMUNICATION SYSTEM

(71) Applicant: ACER INCORPORATED, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/009,761

(22) Filed: Jan. 28, 2016

(65) Prior Publication Data

US 2016/0330790 A1 Nov. 10, 2016

Related U.S. Application Data

(60) Provisional application No. 62/156,910, filed on May 5, 2015.

(51) Int. Cl.
| | |
|---|---|
| *H04W 76/04* | (2009.01) |
| *H04W 52/02* | (2009.01) |
| *H04W 24/02* | (2009.01) |
| *H04W 68/00* | (2009.01) |

(52) U.S. Cl.
CPC ......... *H04W 76/048* (2013.01); *H04W 24/02* (2013.01); *H04W 52/0216* (2013.01); *H04W 52/0219* (2013.01); *H04W 68/005* (2013.01)

(58) Field of Classification Search
CPC .. H04W 52/00–52/0296; H04W 68/00–68/02; H04W 76/048
USPC .................................................. 455/572, 574
See application file for complete search history.

(56) References Cited

U.S. PATENT DOCUMENTS

| | | |
|---|---|---|
| 2013/0242825 A1 | 9/2013 | Farhadi |
| 2014/0036718 A1 | 2/2014 | Gao |

FOREIGN PATENT DOCUMENTS

WO 2012109576 A1 8/2012

*Primary Examiner* — Raymond Dean
(74) *Attorney, Agent, or Firm* — Winston Hsu; Scott Margo

(57) ABSTRACT

A wireless communication system includes a plurality of WTRUs and a network. The plurality of WTRUs are pre-configured so that N WTRUs are identified to be in a specific paging group. Each WTRU in the paging group is configured to monitor related paging channels with an interval longer than the desired paging cycle of the network, thereby reducing power consumption. Each WTRU in the specific paging group takes turns in monitoring related paging channels so that the DRX scheme of the specific paging group is equivalent to the desired DRX scheme of the network, thereby reducing the likelihood of network signaling being missed or delayed.

16 Claims, 5 Drawing Sheets

METHOD OF MANAGING DISCONTINUOUS RECEPTION IN A WIRELESS COMMUNICATION SYSTEM AND RELATED WIRELESS COMMUNICATION SYSTEM

CROSS REFERENCE TO RELATED APPLICATIONS

This application claims priority of U.S. Provisional Application No. 62/156,910 filed on May 5, 2015.

BACKGROUND OF THE INVENTION

1. Field of the Invention

The present invention is related to a method of managing discontinuous reception in a wireless communication system and a related wireless communication system, more particularly, to a method of managing discontinuous reception in a wireless communication system and a related wireless communication system for enhancing power saving while reducing the likelihood of network signaling being missed or delayed.

2. Description of the Prior Art

A communication device, such as a wireless transmit/receive unit (WTRU), may communicate with a remote device via a communication system. The WTRU may be configured to perform machine-to-machine (M2M) or machine-type communications (MTC), which are communications that may be performed without human interaction. MTC WTRUs may operate in a time controlled mode, wherein an MTC WTRU attaches to a network at specified intervals to report data to the network or receive updates from the network.

For MTC WTRUs that run on battery, such as sensors for use in remote maintenance, metering or monitoring, it is a major cost to exchange or charge the on-site batteries for a large amount of devices. Even for scenarios in which MTC WTRUs may consume power from an external power supply, it may be desirable to consume less power for energy efficiency purposes. Discontinuous reception (DRX) is a well-established method which is standardized and implemented in $3^{rd}$ Generation Partnership Project (3GPP) communication systems for power conservation. A user equipment (UE) may exhibit DRX by switching off its receiver for certain periods during the monitoring of the incoming signals, such as paging signals, from the network. It is of course appreciated that the longer the DRX cycle, the greater the potential power consumption saving. In 3GPP Release-12 study on MTC and other mobile data applications communications enhancements, extended DRX (E-DRX) is one of the candidate solutions introduced to improve UE power consumption.

Such known E-DRX method may however exhibit limitations and disadvantages which can become more pronounced with MTC applications. Since MTC applications are not always time-tolerant, the use of a simple, regular, but relatively long DRX cycle may cause communication problems between the MTC application and the MTC application server due to the MTC WTRU not successfully receiving the paging signaling. Extending paging cycle to such a long value may also cause large delay for mobile terminated (MT) service, which means a MT call may be delayed for a long time or even lost. Therefore, there is a need for a method of managing DRX in a wireless communication system for enhancing power saving while reducing the likelihood of network signaling being missed or delayed.

SUMMARY OF THE INVENTION

The present invention provides a method of managing DRX in a wireless communication system which includes a plurality of WTRUs and a network. The method includes pre-configuring the plurality of WTRUs so that N WTRUs are identified to be in a specific paging group; at least one WTRU in the specific paging group sending an apply request associated with scheduled monitoring to the network; the network deciding a DRX setting for the specific paging group according to an amount of apply requests received from the specific paging group and a paging cycle of the network; and the N WTRUs in the specific paging group performing scheduled monitoring on a paging channel based on the DRX setting. At a given point of time when network signaling arrives according to the paging cycle of the network, A WTRUs among the N WTRUs in the specific paging group are configured to turn on for monitoring the paging channel and B WTRUs among the N WTRUs in the specific paging group are configured to turn off, wherein A and B are positive integers, N is equal to a sum of A and B, and A is smaller than N.

The present invention also provides a wireless communication system for managing DRX. The wireless communication system includes a plurality of WTRUs pre-configured in a way so that N WTRUs are identified to be in a specific paging group, and a network configured to decide a DRX setting for the specific paging group according to an amount of apply requests received from the specific paging group and a paging cycle of the network. The N WTRUs are configured to send apply requests associated with scheduled monitoring and perform scheduled monitoring on a paging channel based on the DRX setting. At a given point of time when network signaling arrives according to the paging cycle of the network, A WTRUs among the N WTRUs in the specific paging group are configured to turn on for monitoring the paging channel and B WTRUs among the N WTRUs in the specific paging group are configured to turn off, wherein A and B are positive integers, N is equal to a sum of A and B, and A is smaller than N.

These and other objectives of the present invention will no doubt become obvious to those of ordinary skill in the art after reading the following detailed description of the preferred embodiment that is illustrated in the various figures and drawings.

DETAILED DESCRIPTION

The present application aims at providing a method of handling DRX in a wireless communication system in order to enhance power saving while reducing the likelihood of network signaling, such as paging messages, being missed or delayed. The present method may be applied to a wireless communication system implemented with a radio technology such as the Institute of Electrical and Electronics Engineers (IEEE) 802.16 (WiMAX), IEEE 802-20, European Telecommunications Standards Institute (ETSI), Universal Terrestrial Radio Access (UTRA), evolved UTRA (E-UTRA), Long Term Evolution (LTE), or LTE-advance (LTE-A). However, the type of radio technology adopted by the wireless communication system does not limit the scope of the present application.

Figure 1:
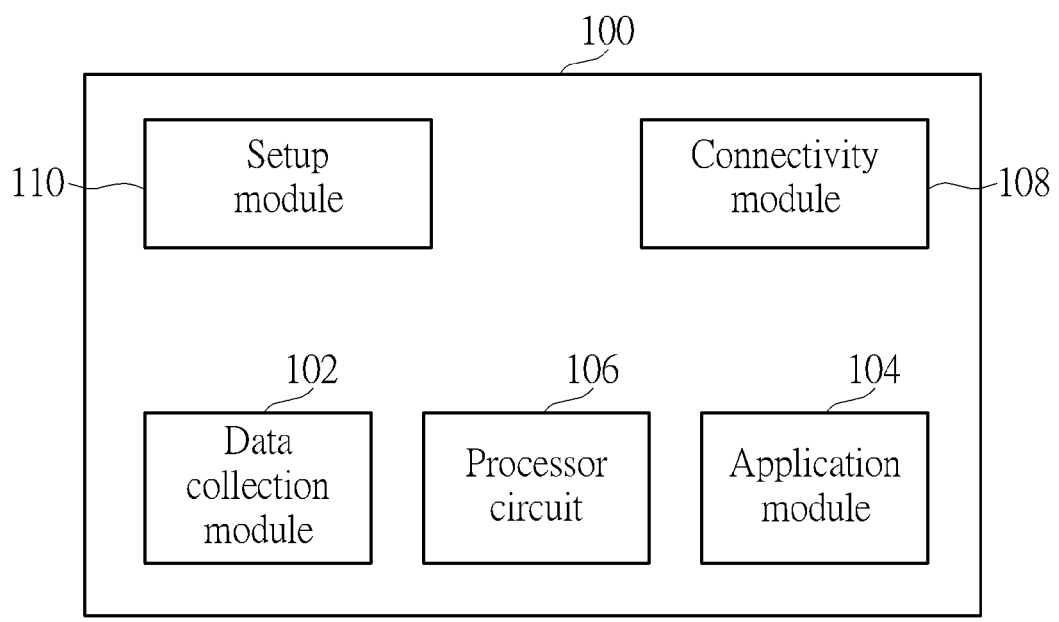
FIG. 1 is a block diagram illustrating a wireless transmit/receive unit in a wireless communication system according to an embodiment of the present application.

FIG. 1 is a block diagram illustrating a WTRU 100 in a wireless communication system according to an embodiment of the present application. The WTRU 100 includes a data collection module 102, an application module 104, a processor circuit 106, a connectivity module 108, and a setup module 110.

The data collection module 102 may include one or multiple sensors or meters which are configured to collect data on a regular, intermittent, or irregular basis. The application module 104 is configured arranged for data collected by the data collection module 102 to be sent to a network in the wireless communication system or schedule exchange of information with the network according to a protocol or arrangement established for a given application. The processor circuit 106 is configured to instruct the WTRU 100 to perform scheduled monitoring on paging channels according to a DRX setting received from the network.

The connectivity module 108 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, WiMAX devices, and/or other well-known devices for connecting to other network entities. The connectivity module 108 may also be implemented with point-to-point (P2P) technologies including, but not limited to, Proximity Services (ProSe), ZigBee or WiFi, so as to provide direct communication with other WTRUs. However, the type of the connectivity module 108 does not limit the scope of the present invention The setup module 108 is configured to verify the status of the WTRU 100, provide authentication/identification information and procedures for communication between the WTRU 100 and the network, and facilitate communicating with the network so as to provision features to the WTRU 100. The WTRU 100 may be provisioned with features which indicate its mobility, location, transmission type, operational mode and/or time tolerance.

In the present invention, the WTRU 100 may be an MTC device such as a utility meter, environment sensor, security sensor, traffic monitor, or other type of MTC devices. However, the type of the WTRU 100 does not limit the scope of the present application.

The present application is characterized by a "Take-Turn-to-Monitor-Paging" property in which different DRX procedures associated with the desired paging cycle of the network are assigned to multiple WTRUs in the same paging group.

Figure 2:
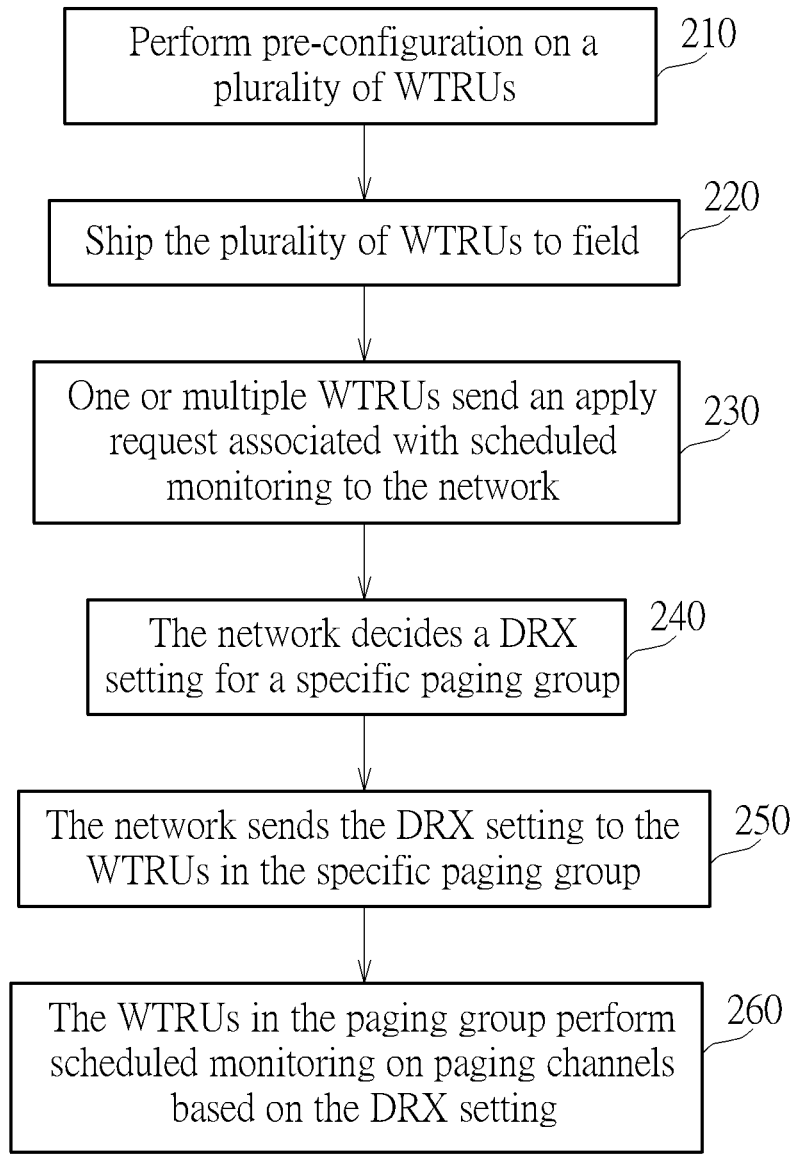
FIG. 2 is a flowchart illustrating a method of handling DRX in a wireless communication system according to an embodiment of the present application.

FIG. 2 is a flowchart illustrating a method of handling DRX in a wireless communication system according to an embodiment of the present application. The flowchart of FIG. 2 includes the following steps:

Step 210: perform pre-configuration on a plurality of WTRUs; executed step 220.

Step 220: ship the plurality of WTRUs to field; executed step 230.

Step 230: one or multiple WTRUs send an apply request associated with scheduled monitoring to the network; executed step 240.

Step 240: the network decides a DRX setting for a specific paging group; executed step 250.

Step 250: the network sends the DRX setting to the WTRUs in the specific paging group; executed step 260.

Step 260: the WTRUs in the paging group perform scheduled monitoring on paging channels based on the DRX setting.

Figure 3:
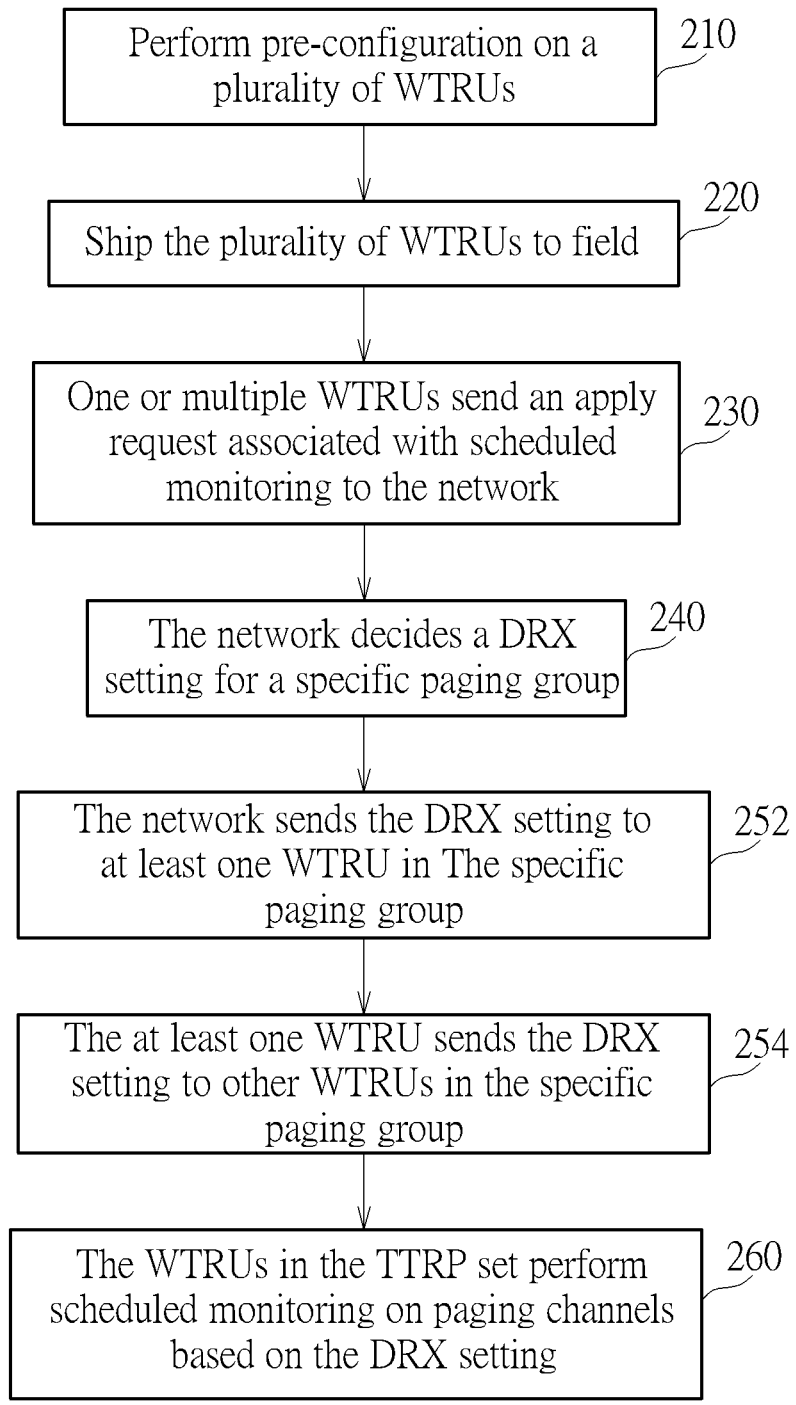
FIG. 3 is a flowchart illustrating a method of handling DRX in a wireless communication system according to another embodiment of the present application.

FIG. 3 is a flowchart illustrating a method of handling DRX in a wireless communication system according to another embodiment of the present application. The flowchart of FIG. 3 includes the following steps:

Step 210: perform pre-configuration on a plurality of WTRUs; executed step 220.

Step 220: ship the plurality of WTRUs to field; executed step 230.

Step 230: one or multiple WTRUs send an apply request associated with scheduled monitoring to the network; executed step 240.

Step 240: the network decides a DRX setting for a specific paging group; executed step 250.

Step 252: the network sends the DRX setting to at least one WTRU in the specific paging group; executed step 245.

Step 254: the at least one WTRU sends the DRX setting to other WTRUs in the specific paging group; executed step 260.

Step 260: the WTRUs in the paging group perform scheduled monitoring on paging channels based on the DRX setting.

In step 210, the purpose of pre-configuration is to generate a unique group ID for devices in the same paging group. In an embodiment, each WTRU may perform the pre-configuration using communication technologies including, but not limited to, ProSe, ZigBee or WiFi. In another embodiment, the unique paging group ID for each paging group can be assigned by the network during the pre-configuration.

In the present invention, all WTRUs in the same paging group are characterized by the following features as provisioned by respective setup modules 106:

(1) all WTRUs in the same paging group have low mobility or no mobility;
(2) all WTRUs in the same paging group are located in proximity of each other; and
(3) all WTRUs in the same paging group are used for the same purpose or for reporting similar things.

In step 220, the pre-configured WTRUs are shipped to field. For example, the WTRUs may be dispatched to different operational sites for the above-mentioned MTC applications. In the present application, the WTRUs in a specific paging group may be shipped to field for the same application.

In step 230, one or multiple WTRUs, which may or may not belong to the same paging group, may send the apply request to the network in order to apply for scheduled monitoring on paging channels. Each apply request includes at least a paging group ID, and may further includes an indicator and an apply time interval and/or a group size.

The paging group ID is the unique identification assigned to each WTRU in the corresponding paging group during the pre-configuration. The network can thus determine whether two WTRUs each sending an apply request belong to the same paging group according to respective paging group IDs.

If the apply request is used in different procedures, the indicator may be used to inform the network that the current apply request is associated with applying scheduled monitoring on paging channels. If the apply request is uniquely used in a single procedure of applying scheduled monitoring on paging channels, the indicator may be omitted.

The group size is the amount of WTRUs in a specific paging group. After receiving the apply request associated with scheduled monitoring from a specific paging group for the first time, the network may be informed that the specific paging group includes 6 WTRUs according to the group size. Under such circumstance, the network can start to execute step 240 after having receiving all 6 apply requests from the WTRUs in the specific paging group.

The apply time interval is the maximum time that the network can wait before deciding the DRX setting for a specific paging group. In an embodiment, the apply time interval may be determined by all WTRUs in the specific paging group during the pre-configuration using communication technologies including, but not limited to, ProSe, ZigBee or WiFi. In another embodiment, the apply time interval may be determined by the network. After performing pre-configuration step 210, all WTRUs in this specific paging group are configured to send an apply request for applying scheduled monitoring on paging channels within this apply time interval. Under such circumstance, the network can start to execute step 240 when the apply time interval has elapsed after having received the first apply request associated with scheduled monitoring from the specific paging group.

In step 240, the network is configured to decide the DRX setting for the specific paging group. The DRX setting may include the monitoring cycle and start offset of each WTRU in the specific paging group. Assuming that the network's desired paging cycle is Ln and the network has received x apply requests associated with scheduled monitoring from the specific paging group (x is an integer larger than 1), the monitoring cycle Ld of each WTRU and start offsets d1~dx of the WTRUs may be represented by the following formula:

$$Ld = x*Ln \quad (1)$$

$$d1=T1, d2=T1+Ln, \ldots, dx=T1+Ln*(x-1) \quad (2)$$

As depicted in formula (1), the monitoring cycle Ld of each WTRU in the specific paging group is x times longer than the desired paging cycle Ln of the network. In other words, each WTRU in the specific paging group is configured to monitor the paging signals from the network based on an extended monitoring cycle scheme, thereby reducing power consumption.

As depicted in formula (2), the start offsets d1~dx indicate the start points of respective monitoring cycles of each WTRU in the specific paging group. The values of the start offsets d1~dx may be determined according to the amount of WTRUs in the specific paging group, the start point of the paging cycle of the network, and the timing mechanism, such as system frame number (SFN), adopted by the network.

In the embodiment illustrated in FIG. 2, the network is configured to send the DRX setting to all WTRUs in the specific paging group in step 250. In step 260, the WTRUs in the specific paging group are configured to perform scheduled monitoring on paging channels based on the DRX setting.

In the embodiment illustrated in FIG. 3, the network is configured to send the DRX setting to at least one WTRU in the specific paging group in step 252. In step 254, the at least one WTRU may send the DRX setting to other WTRUs in the specific paging group using communication technologies including, but not limited to, ProSe, ZigBee or WiFi. In step 260, the WTRUs in the specific paging group are configured to perform scheduled monitoring on paging channels based on the DRX setting.

Figure 4:
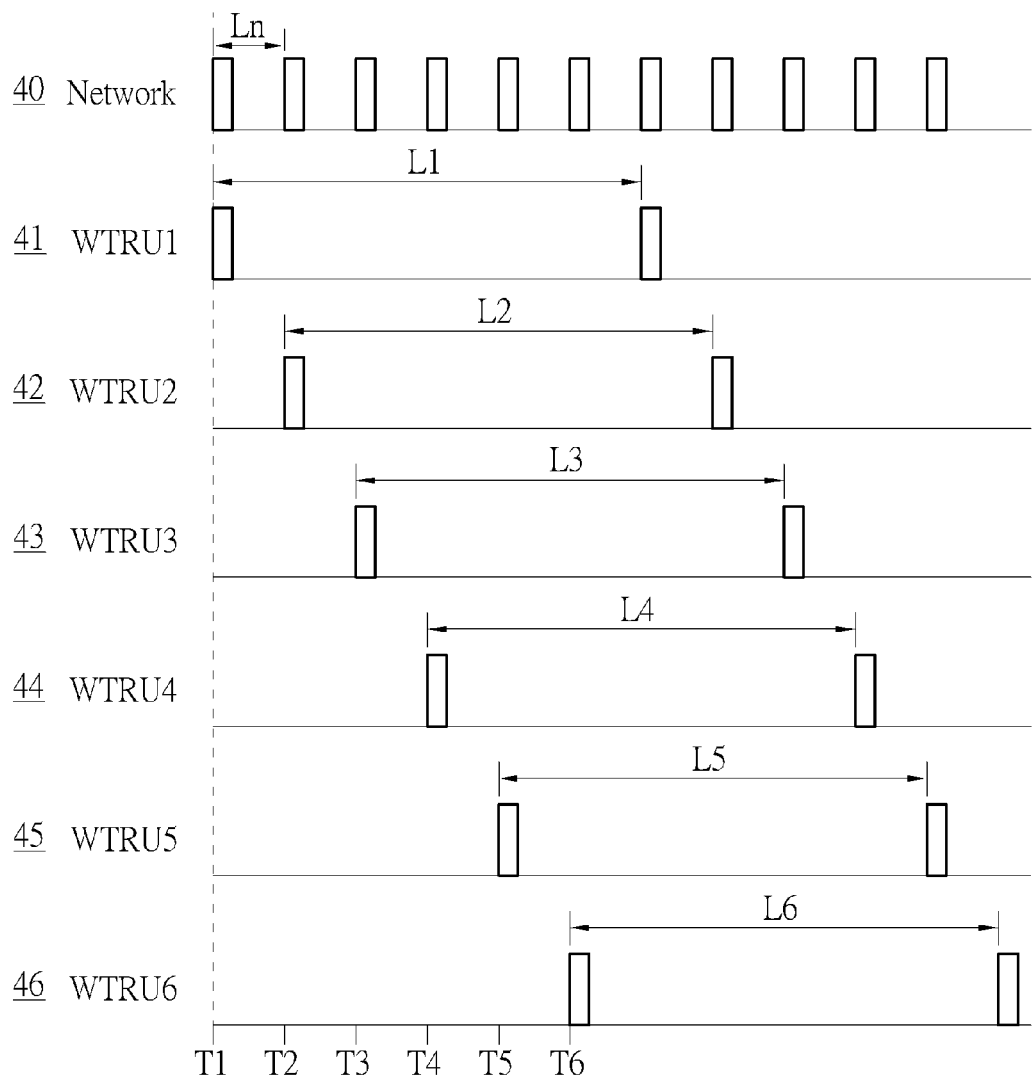
FIG. 4 is a timing diagram illustrating a method of performing scheduled monitoring on paging channels according to an embodiment of the present invention.
Figure 5:
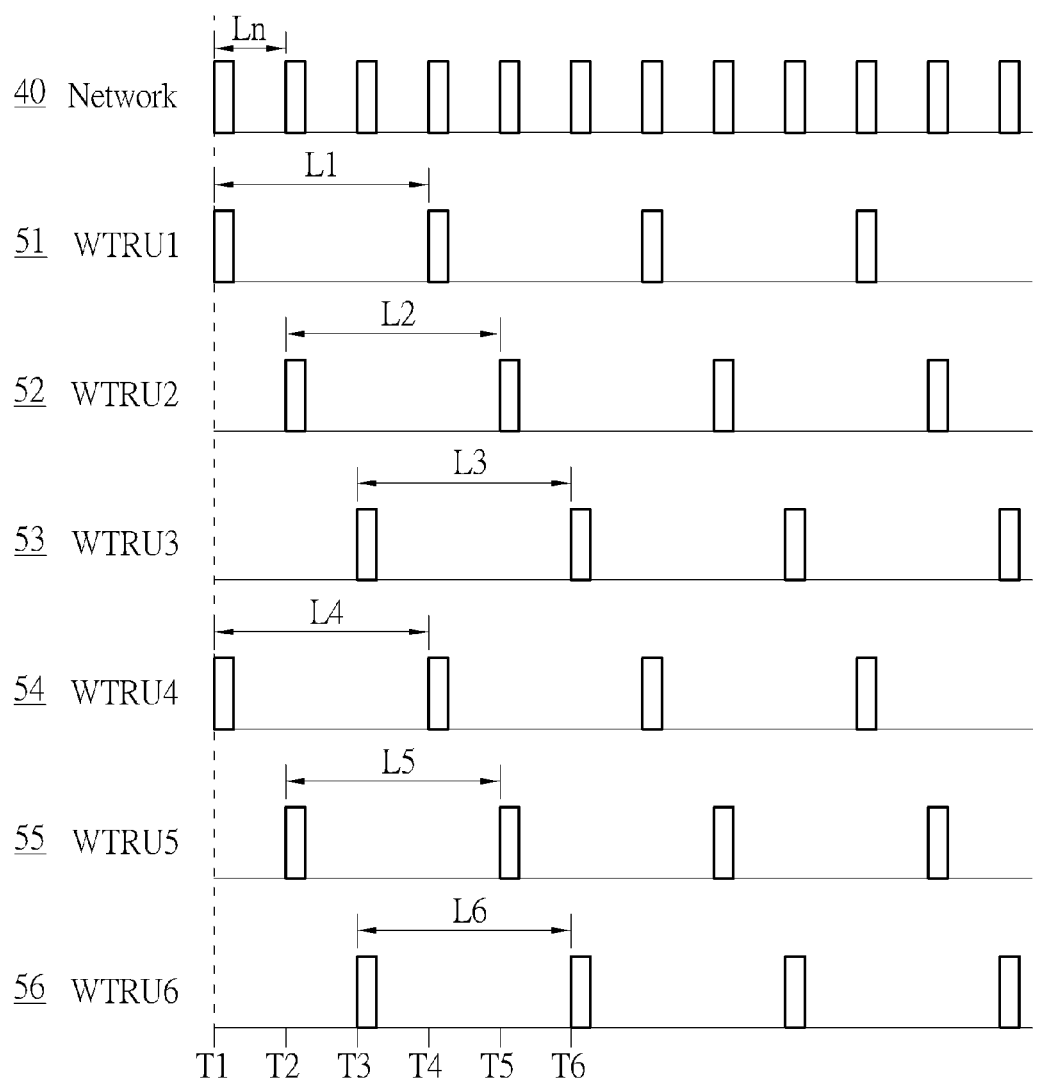
FIG. 5 is a timing diagram illustrating a method of performing scheduled monitoring on paging channels according to another embodiment of the present invention.

FIGS. 4 and 5 are timing diagrams illustrating methods of performing scheduled monitoring on paging channels according to an embodiment of the present invention. Assuming that the specific paging group includes 6 devices WTRU1~WTRU6, Chart 40 depicts desired DRX scheme of the network, Charts 41~46 depict the actual extended monitoring cycle schemes of WTRU1~WTRU6 in FIG. 4, and Charts 51~56 depict the actual extended monitoring cycle schemes of WTRU1~WTRU6 in FIG. 5. Instead of scheduling the same DRX cycle of Ln for each WTRU in the specific paging group, the WTRU1~WTRU6 are provided with different extended monitoring cycle schemes. More specifically, the extended monitoring cycle scheme of the WTRU1 is associated a DRX cycle of L1 and a start offset of d1, the extended monitoring cycle scheme of the WTRU2 is associated a DRX cycle of L2 and a start offset of d2, the extended monitoring cycle scheme of the WTRU3 is associated a DRX cycle of L3 and a start offset of d3, the extended monitoring cycle scheme of the WTRU4 is associated a DRX cycle of L4 and a start offset of d4, the extended monitoring cycle scheme of the WTRU5 is associated a DRX cycle of L5 and a start offset of d5, and the extended monitoring cycle scheme of the WTRU6 is associated a DRX cycle of L6 and a start offset of d6.

In the embodiment depicted in FIG. 4, at a given point of time when the network signaling arrives (at T1~T6), only one WTRU in the specific paging group is turned on for monitoring the paging channel (WTRU1 at T1, WTRU2 at T2, WTRU3 at T3, WTRU4 at T4, WTRU5 at T5, and WTRU6 at T6), while all other WTRUs in the paging group is turned off. More specifically, the DRX setting of the specific paging group decided by the network indicates that L1=L2=L3=L4=L5=L6=6*Ln, d1=0, d2=Ln, d3=2*Ln, d4=3*Ln, d5=4*Ln and d6=5*Ln. Since each WTRU in the paging group is configured to monitor related paging channels at an interval 6*Ln which is longer than the scheduled paging cycle Ln of the network, power consumption can be reduced. With each WTRU in the specific paging group taking turns in monitoring the paging channels (by introducing the start offsets d1~d6), the DRX scheme of the specific paging group is equivalent to the desired DRX scheme of the network. Therefore, the present application can enhance power saving while reducing the likelihood of network signaling being missed or delayed.

In the embodiment depicted in FIG. 5, at a given point of time when the network signaling arrives (at T1~T6), two WTRUs (fewer than 6) in the specific paging group are turned on for monitoring the paging channel (WTRU1 and WTRU4 at T1, WTRU2 and WTRU5 at T2, and WTRU3 and WTRU6 at T3), while all other WTRUs in the paging group is turned off. More specifically, the DRX setting of the specific paging group decided by the network indicates that L1=L2=L3=L4=L5=L6=3*Ln, d1=d4=0, d2=d5=Ln, d3=d6=2*Ln. Since each WTRU in the paging group is configured to monitor related paging channels at an interval 3*Ln which is longer than the scheduled paging cycle Ln of the network, power consumption can be reduced. With each WTRU in the specific paging group taking turns in monitoring the paging channels (by introducing the start offsets d1~d6), the DRX scheme of the specific paging group is equivalent to the desired DRX scheme of the network. Therefore, the present application can enhance power saving while reducing the likelihood of network signaling being missed or delayed.

In an embodiment of the present application, the method of managing DRX in a wireless communication system may be implanted in the radio resource control (RRC) layer. More specifically, one or multiple WTRUs may send an apply request associated with scheduled monitoring to a base station in the network in step 230, and the base station may decide a DRX setting for a specific paging group in step 240. The base station may be a Node-B (NB) in a UTRAN system or an evolved NB (eNB) in an E-UTRAN system. However, the type of the base station does not limit the scope of the present application.

In another embodiment of the present application, the method of managing DRX in a wireless communication system may be implanted in the non-access stratum (NAS) layer. More specifically, one or multiple WTRUs may send an apply request associated with scheduled monitoring to a mobility management entity (MME) in the network in step 230, and the MME may decide a DRX setting for a specific paging group in step 240. However, the type of the MME does not limit the scope of the present application.

In an embodiment of the present application, the method of managing DRX in a wireless communication system may be applied to the WTRU 100 which adopts a legacy DRX defined in related 3GPP specifications for enhancing power saving while reducing the likelihood of network signaling, such as paging messages, being missed or delayed.

In another embodiment of the present application, the method of managing DRX in a wireless communication system may be applied to the WTRU 100 which already adopts the E-DRX defined in related 3GPP specifications for power conservation purpose. The present method can further enlengthening the sleep cycle of the WTRU 100, thereby further enhancing power saving while reducing the likelihood of network signaling, such as paging messages, being missed or delayed.

In conclusion, the present application provides a method of handling DRX in a wireless communication system capable of enhancing power saving while reducing the likelihood of network signaling, such as paging messages, being missed or delayed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing discontinuous reception (DRX) in a wireless communication system which includes a plurality of wireless transmit/receive units (WTRUs) and a network, the method comprising:
    pre-configuring the plurality of WTRUs so that N WTRUs are identified to be in a specific paging group;
    at least one WTRU in the specific paging group sending an apply request associated with scheduled monitoring to the network;
    the network deciding a DRX setting for the specific paging group according to an amount of apply requests received from the specific paging group and a paging cycle of the network; and
    the N WTRUs in the specific paging group performing scheduled monitoring on a paging channel based on the DRX setting, wherein:
        at a given point of time when network signaling arrives according to the paging cycle of the network, A WTRUs among the N WTRUs in the specific paging group are configured to turn on for monitoring the paging channel and B WTRUs among the N WTRUs in the specific paging group are configured to turn off;
        A and B are positive integers;
        N is equal to a sum of A and B; and
        A is smaller than N.

2. The method of claim 1, further comprising:
    the network sending the DRX setting to the N WTRUs in the specific paging group.

3. The method of claim 1, further comprising:
    the network sending the DRX setting to the at least one WTRU in the specific paging group; and
    the at least one WTRU in the specific paging group sending the DRX setting to other WTRUs in the specific paging group.

4. The method of claim 1, wherein pre-configuring the plurality of WTRUs comprises:
    generating a unique group identification (ID) for the N WTRUs in the specific paging group.

5. The method of claim 4, wherein the apply request associated with scheduled monitoring includes the unique group ID of the at least one WTRU in the specific paging group and an apply time interval.

6. The method of claim 5, further comprising:
    the network starting to decide the DRX setting for the specific paging group when the apply time interval has elapsed after receiving the apply request from the at least one WTRU in the specific paging group.

7. The method of claim 4, wherein the apply request associated with scheduled monitoring includes the unique group ID of the at least one WTRU in the specific paging group and a group size.

8. The method of claim 7, further comprising:
    the network starting to decide the DRX setting for the specific paging group after having received all apply requests from the specific paging group as indicated by the group size.

9. The method of claim 1, wherein:
    the DRX setting includes a monitoring cycle and a start offset of each WTRU in the specific paging group;
    the monitoring cycle of each WTRU in the specific paging group is longer than the paging cycle of the network; and
    the start offset of each WTRU in the specific paging group indicate a start point of a corresponding monitoring cycle of each WTRU in the specific paging group.

10. The method of claim 1, wherein sending the apply request and deciding the DRX setting for the specific paging group are implemented in a radio resource control (RRC) layer or a non-access stratum (NAS) layer of the wireless communication system.

11. The method of claim 1, wherein the N WTRUs in the specific paging group are characterized by at least one of following features:
    the N WTRUs have a low mobility or are stationary;
    the N WTRUs are located in proximity of each other; and the N WTRUs are used for a same application or for reporting relevant data.

12. A wireless communication system for managing DRX, comprising:
a plurality of WTRUs pre-configured in a way so that N WTRUs are identified to be in a specific paging group, the N WTRUs configured to:
send apply requests associated with scheduled monitoring; and
perform scheduled monitoring on a paging channel based on a DRX setting; and
a network configured to decide the DRX setting for the specific paging group according to an amount of apply requests received from the specific paging group and a paging cycle of the network, wherein:
at a given point of time when network signaling arrives according to the paging cycle of the network, A WTRUs among the N WTRUs in the specific paging group are configured to turn on for monitoring the paging channel and B WTRUs among the N WTRUs in the specific paging group are configured to turn off;
A and B are positive integers;
N is equal to a sum of A and B; and
A is smaller than N.

13. The wireless communication system of claim 12, wherein the network is further configured to pre-configure the plurality of WTRUs by assigning a unique group ID to the N WTRUs in the specific paging group.

14. The wireless communication system of claim 12, wherein the NWTRUs are configured to generate a unique group ID using a point-to-point (P2P) technology so as to be identified in the specific paging group.

15. The wireless communication system of claim 12, wherein:
a monitoring cycle of each WTRU in the specific paging group is longer than the paging cycle of the network.

16. The wireless communication system of claim 12, wherein the N WTRUs in the specific paging group are characterized by at least one of following features:
the N WTRUs have a low mobility or are stationary;
the N WTRUs are located in proximity of each other; and
the N WTRUs are used for a same application or for reporting relevant data.

* * * * *